Patented Feb. 22, 1927.

1,618,708

UNITED STATES PATENT OFFICE.

CHARLES HOAR, OF WILKES-BARRE, PENNSYLVANIA.

LUBRICANT.

No Drawing. Application filed October 28, 1925. Serial No. 65,476.

This invention relates to new and useful improvements in lubricants and more particularly to lubricating compounds for use in bearings, journals, gearing, and the like, and such as to prevent the parts to which lubricant is applied from becoming overheated, and when applied to overheated bearings will readily aid in rapidly reducing the heat thereof.

The composition of my lubricant is such that any rough places in the bearing or part to which the lubricant is applied is readily made smooth and slippery and the lubricant suppresses and prevents the heating and consequent deterioration of the metal.

My new and improved lubricating compound comprises a mixture of grease, graphite, pulverized charcoal and ammonia. These various ingredients are preferably thoroughly intermixed in the following proportions:—grease 20 lbs., graphite 2 lbs., pulverized charcoal 4 lbs., ammonia ½ pint.

The grease forms the bulk or main body of the lubricant composition. The graphite acts to smooth the face or surface of the shaft, bearing, gear, or journal to which the lubricant is applied, and will leave no unsmooth or rough surface after it has been used. The charcoal which is very finely powdered before being used in the mixture acts as an aid to the graphite and when used as in my composition they so intermix and combine as to effect a much greater smoothing of the parts than when graphite alone is used. The grease above referred to acts to collect dust or dirt on the metallic part to which the lubricant is applied and the ammonia, which is preferably of the strength ordinarily used for household purposes, about 5 to 15%, aids in the collection and removal of the dust or dirt from the shafts or bearings or other part and in addition greatly strengthens the body of the compound. That is to say, the ammonia acts as a mild detergent tending to keep the bearing or shaft free from corrosion and the grease acts to collect any particles of corrosion while at the same time lubricating the shafts or bearings. It will be obvious, of course, that in cases where a bearing has greatly corroded a somewhat stronger solution of ammonia may be used in the compound, but for all practical purposes a solution of from 5 to 15% will be satisfactory.

Having thus fully described my invention, what I claim as new and desire to secure by Letters Patent of the United States, is:—

A lubricating compound of the class described comprising grease, twenty pounds, graphite, two pounds, pulverized charcoal, four pounds, and ammonia, one half pint, thoroughly intermixed, substantially as set forth.

In testimony whereof I hereunto affix my signature.

CHARLES HOAR.